United States Patent [19]

Fleitas

[11] 4,382,495
[45] May 10, 1983

[54] FOUR-WHEEL DRIVE CLUTCH

[75] Inventor: Arthur M. Fleitas, Loveland, Colo.

[73] Assignee: Dualmatic Manufacturing Company, Longmont, Colo.

[21] Appl. No.: 227,364

[22] Filed: Jan. 22, 1981

Related U.S. Application Data

[63] Continuation-in-part of Ser. No. 180,699, Aug. 25, 1980, Pat. No. 4,369,868.

[51] Int. Cl.³ .................. F16D 11/00; B60K 17/34
[52] U.S. Cl. .................................... 192/36; 180/247; 192/49; 192/54; 192/67 R; 192/93 A
[58] Field of Search .................. 192/35, 36, 49, 54, 192/67 R, 93 A; 180/245, 247

[56] References Cited

U.S. PATENT DOCUMENTS

| | | | |
|---|---|---|---|
| 4,192,411 | 3/1980 | Fogelberg | 180/245 X |
| 4,287,972 | 9/1981 | Petrak | 192/93 A X |
| 4,300,667 | 11/1981 | Fogelberg | 180/247 X |
| 4,343,386 | 8/1982 | Schaefer | 192/54 |

Primary Examiner—Allan D. Herrmann
Attorney, Agent, or Firm—Edwin L. Spangler, Jr.

[57] ABSTRACT

This invention relates to an improved automatic four-wheel drive clutch of the type forming the subject matter of my copending application U.S. Ser. No. 180,699, now U.S. Pat. No. 4,369,868, but differing therefrom in that instead of employing axially-spaced toothed cam surfaces with toothed cam followers forming an operative connection therebetween effective upon relative rotation to move a drive member into and out of driving engagement with a driven element, circumferentially-spaced coaxial cam rings carrying opposed pairs of overlapped oppositely opening generally V-shaped track-forming grooves operatively interconnected by a single ball between each pair is used to shift the drive element axially between its engaged and disengaged positions.

10 Claims, 3 Drawing Figures

FOUR-WHEEL DRIVE CLUTCH

This application is a continuation-in-part of Ser. No. 180,699, Aug. 25, 1980.

In my copending application for Letters Patent of the United States Ser. No. 180,699 filed Aug. 25, 1980, now U.S. Pat. No. 4,369,868, of which the present application is a continuation-in-part, I disclose an automatic clutch for four-wheel drive vehicles having as one of its characterizing features a ring carrying at least two and preferably three equiangularly spaced toothed rollers, tangent points on the inside of which travel a circular path around a track defined by an outwardly-facing ring of teeth on a thrust plate backed up by a friction member biased axially thereagainst so as to permit relative rolling meshed engagement therebetween until a point is reached where the rollers can no longer turn whereupon the thrust plate and roller-carrying ring rotate in unison along with the front steerable wheel. Continued rotation of the rollers is prevented by their reaching stops provided at opposite ends of concave toothed cam surfaces which they roll along on the inwardly-facing end of a so-called sliding gear subassembly. The cam-carrying portion of this subassembly is normally biased axially inward to hold the cams and rollers meshed at all times. Relative rolling engagement of the rollers from the low point of the cams to a high point thereon where one of the stops is located functions to move the sliding gear subassembly axially outward. The resulting axial movement causes a driving connection to be established between the front steerable wheel and the front axle. Once this connection is established, the sliding gear subassembly, roller-carrying ring, thrust plate, wheel and axle continue to turn as a unit.

I have recently discovered that a significantly improved clutch patterned along the same basic lines as my previous one can be made by eliminating the toothed rollers, associated tracks and cams and substituting therefor a unique system of balls and grooved ball tracks. More specifically, the required relative axial movement of the sliding gear subassembly necessary to both establish the driving connection between the wheel and axle as well as disconnect same is more easily and reliably carried out by allowing balls retained in equiangularly-spaced relation between a coaxial circumferentially-spaced set of grooved cam rings to roll within an overlapped pair of generally V-shaped track-forming grooves provided in the latter as limited relative rotational movement takes place therebetween in response to like relative movement between the wheel and axle. The clutch element which replaces the thrust plate of my earlier design is still yieldably restrained against rotation by a friction member biased thereagainst and, as before, once the balls reach the end of their paired tracks to bring about the driving connection between the wheel and axle, this clutch element rotates by sliding over its friction member thus overriding the braking force therebetween. This same clutch element now carries an inner ball race which cooperates with an outer one on the inside of the driven element connected to the wheel and a plurality of ball bearings therebetween to produce a much better antifriction coupling between the stationary spindle and wheel when the latter is free wheeling.

The sliding gear subassembly is, of course, also extensively modified to replace the toothed concave cams with the V-shaped ball tracks. It is still preferably made in at least two axially-spaced parts normally-biased apart by a spring; however, the specific arrangement is somewhat different from that of my earlier application.

The toothed rollers and ring upon which they were mounted is replaced by the balls and the retaining ring therefor. Functionally, however, these balls, their retainer, and the elements carrying the oppositely-facing V-shaped tracks that these balls run in do the exact same thing as my previous intermeshed teeth, namely, move the sliding gear subassembly in and out axially in response to relative rotation between the axle and wheel to both connect and disconnect the two.

It is, therefore, the principal object of the present invention to provide a novel and improved selective drive clutch for four-wheel drive vehicles.

A second objective is to provide a device of the type aforementioned which is fully automatic in operation and the driver need only actuate the front wheel drive and move the vehicle under its own power a few feet in a selected direction to both engage and disengage same.

Another object of the within described invention is the provision of a four-wheel drive hub which employs a simple ball and cam groove arrangement to accomplish an axial shift of a drive element into and out of driving engagement with a driven element.

Still another object is to provide a clutch of the character described which is capable of withstanding repeated actuations under the most unfavorable of operating conditions without experiencing undue wear or malfunctioning.

An additional object is the provision of a selective drive clutch for four-wheel drive vehicles that utilizes a unique arrangement of grooved cam rings defining opposed ball-tracks and a single ball between each pair thereof to effect an axial shift of two interlockable parts upon combined rotational and axial movement of one cam ring relative to the other.

Further objects are to provide an automatic four-wheel drive clutch that is simple, rugged, easily serviced and repaired, versatile, efficient, lightweight, compact and readily adapted for use on various different four-wheel drive vehicles.

Other objects will be in part apparent and in part pointed out specifically hereinafter in connection with the description of the drawings that follows, and in which.

Figure 1:
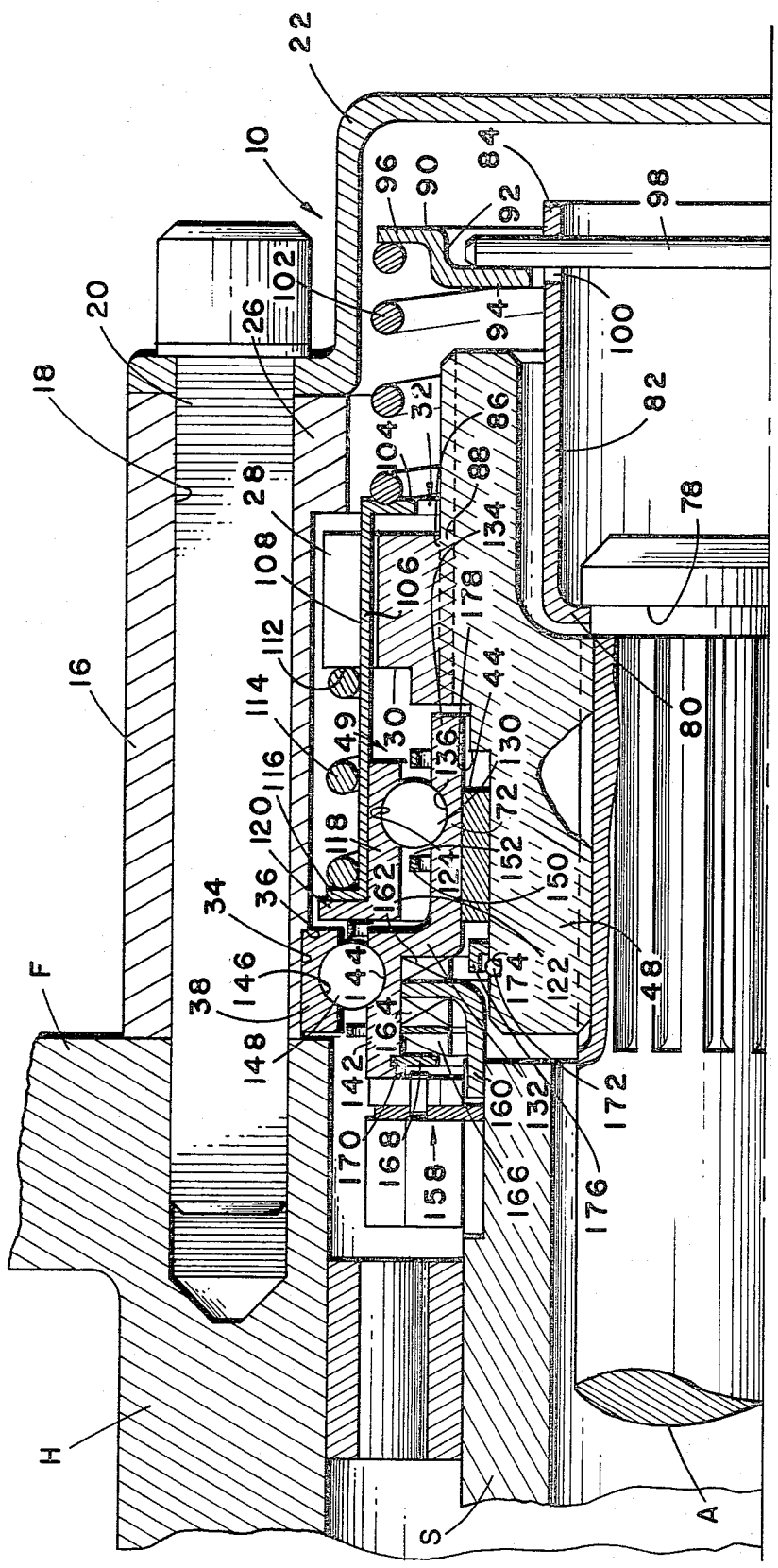
FIG. 1 is a fragmentary diametrical quarter section, portions of which have been broken away to expose the interior construction, showing the clutch in disengaged position as it relates to the axle, spindle and steerable front wheel assembly of a four-wheel drive vehicle.
Figure 2:
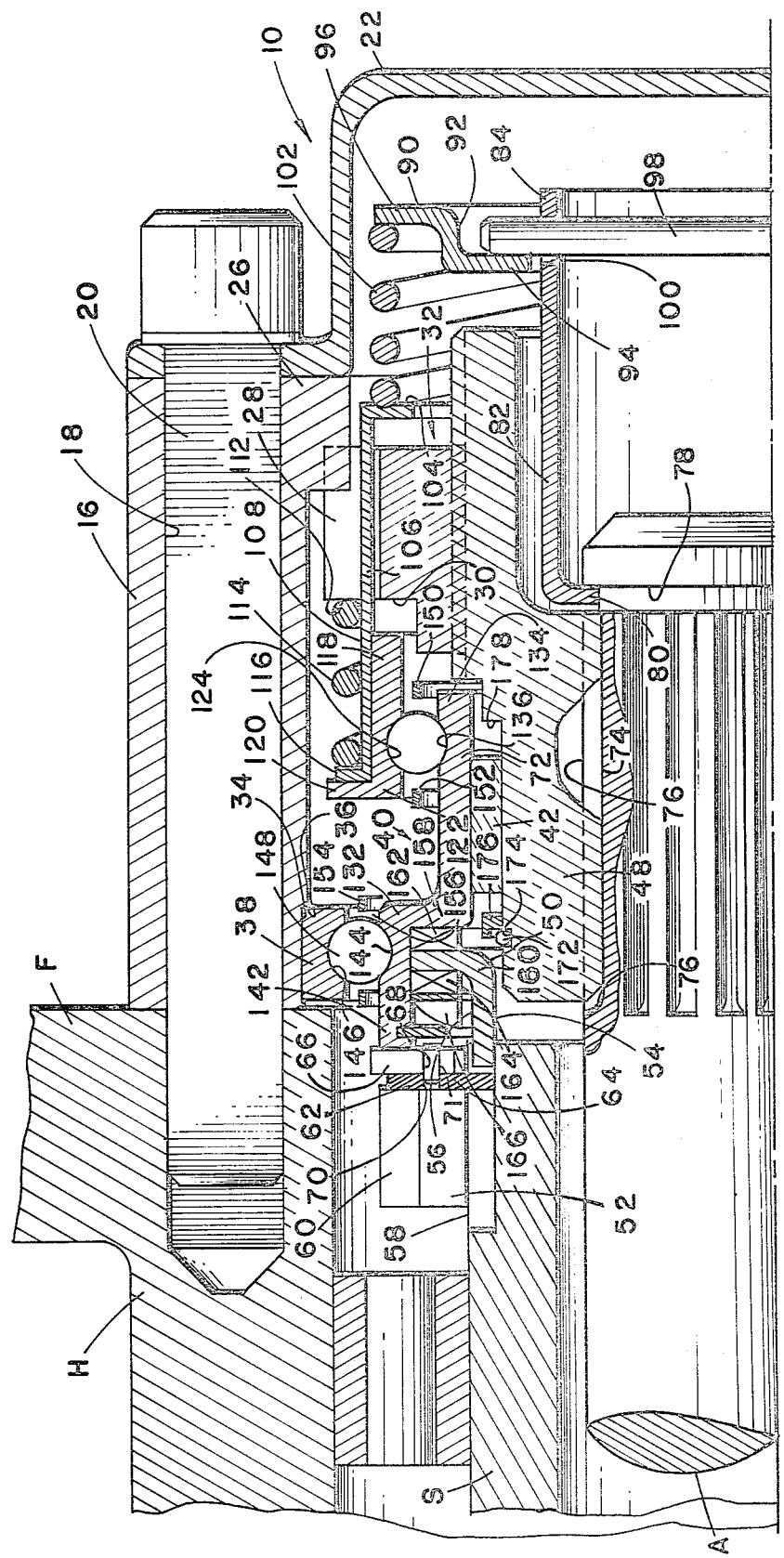
FIG. 2 is a fragmentary diametrical quarter section similar to FIG. 1 and to the same scale but differing therefrom in that the elements are shown in partially-engaged relation; and, FIG. 3 is an exploded perspective view of the clutch showing its several parts in the approximate relationship in which they go together in assembled relation.

Referring next to the drawings for a detailed description of the improved four-wheel drive clutch that has been broadly designated hereby by reference numeral 10 and, initially at least, to FIGS. 1 and 2 for this purpose, reference letter A has been chosen to identify the front axle of a four-wheel drive vehicle which is journalled for rotation inside a hollow spindle S that does not rotate but pivots to define a steerable subassembly. On the outside of spindle S, a hub H is journalled for rotation in the conventional manner and this hub is bordered by a wheel-mounting flange F onto which a steerable front wheel (not shown) is detachably fastened. These details differ from one front wheel drive vehicle to another as do elements of the clutch 10 which must integrate therewith.

The clutch 10 has as its sole function that of automatically connecting and disconnecting axle A from a driven element connected to the mounting flange F in any number of standard ways for conjoint rotation therewith. The essential features of such a driven element as far as the clutch of the present invention are concerned can be found in element 16 of the drawings which, in the particular form illustrated, comprises a hollow generally-cylindrical member containing a plurality of axially-extending apertures 18 for receiving bolts 20 that fasten it to the front wheel hub assembly for conjoint rotation therewith. In some vehicles, hub H projects out beyond the flange F and is internally splined. In such instance, the driven element 16 is externally splined to mate with the hub splines and the dust cap 22 performs an additional function of holding these elements in assembled relation. As illustrated, a simple externally-flanged dust cap 22 is shown held in place on the outer end of the driven element 16 by the aforementioned bolts. Disposed in a ring at the outer end of the hollow interior 24 (FIG. 3) of the driven element are a series of integrally-formed equiangularly-spaced teeth 26 that mesh with a mating set of teeth 28 on element 30 of the sliding gear subassembly, which has been indicated broadly by reference numeral 32, to define a driving coupling to axle A in a manner soon to be described. The inner end of the hollow interior 24 of the driven element 16 contains, in the particular form illustrated, a cylindrical enlargement 34 bordered on its outer end by an annular shoulder 36 that defines a stop for outer bearing race 38. When bolts 20 thread into mounting flange F of the front wheel drive assembly and snug up the inner end of driven element 16 thereagainst, they draw shoulder 36 in against the outer end of outer race 38 as shown, the ball and cam subassembly 40 of which it forms a part, being mounted on the outer surface 42 of a bronze bushing 44 which, in turn, is mounted upon the cylindrical surface 46 of splined element 48.

This is, perhaps, the best time to mention the broad principal upon which my four-wheel drive clutches as well as others function in automatic, as opposed to manual, operation. Under normal driving conditions, the axle A is disconnected from the drive train to the rear wheels and, of course, one of the main functions performed by a four-wheel drive clutch is that of disconnecting the front wheels from their respective axles so that the latter do not turn in response to the wheels rolling over the ground. In this instance, while the wheel, axle A, hub H and spindle S all pivot as a unit, only the wheel and hub are rotating as one. With axle A operatively connected to the drive train, on the other hand, it should be actuated to effect a driving connection to the wheel, whereupon, the hub, wheel and axle will turn as a unit powered by the engine of the vehicle. To bring about automatic operation therefor, the relative motion possible between the wheel and axle, axle and spindle and wheel and spindle must be used to advantage.

In the clutch forming the subject matter hereof as well as that described in the parent application already referred to, the driven element 16 turns with the hub H and wheel mounted thereon, splined element 48 and the sliding gear subassembly 32 turn with axle A, and the elements that function to connect and disconnect the two all basically depend from spindle S.

Figure 3:
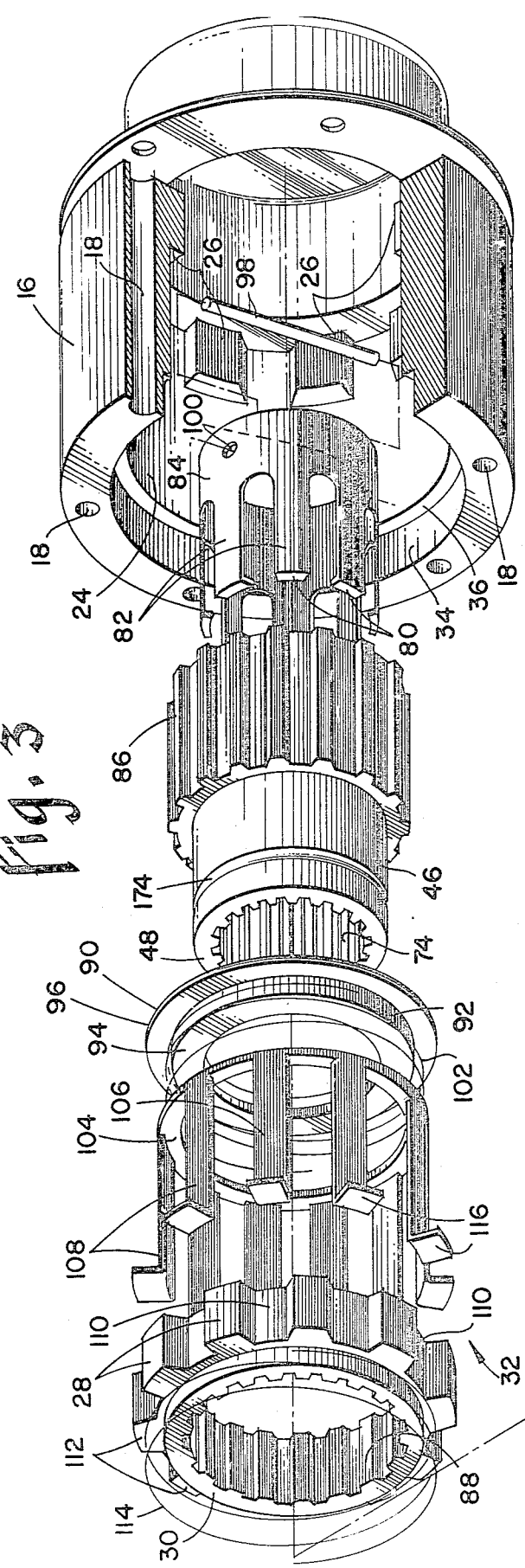

Referring next to all three FIGS. 1, 2 and 3, it can be seen that one of the key elements is an externally-flanged collar 50 which has a dog 52 projecting inwardly from its cylindrical portion 54. This dog slips into an external axially-directed keyway 56 in the outer threaded end 58 of the spindle. Screwed onto threaded spindle section 58 is a nut 60 which functions as a limit stop behind apertured washer 62. Washer 62 has an integrally-formed key 64 (see FIG. 3) that fits into keyway 56 and prevents it from rotating. Also screwed onto the threaded end 58 of spindle S is a second nut 66 having at least one internally-threaded aperture 68 that can be axially aligned with one of the apertures 70 in keyed washer 62. When thus aligned, a set screw 71 is inserted to lock the keyed washer and nut 66 together so as to prevent the latter from rotating. Elements 60, 62 and 66 cooperate therefor, to define an adjustable abutment on the threaded end 58 of the spindle against which the inner grooved cam ring 72 of ball and cam subassembly 40 abuts. Nut 66 cooperates with the keyway 56 to produce an axially-directed socket for the dog 52 on the cylindrical portion 54 of flanged collar 50.

Splined member 48 has the portion 74 thereof inside outer cylindrical surface 46 internally splined to mate with the external splines 76 on the end of the axle A. Axle A is also peripherally grooved at 78 to receive the inturned finger tips 80 on the inner ends of spring fingers 82 formed integral with sleeve 84. By springing these fingers open and allowing the inturned finger tips 80 on the inner ends thereof to drop into the peripheral groove in the end of the axle A, an extension of the latter is formed which projects somewhat beyond the outer externally-splined end 86 of splined member 48. Sliding gear 30 is internally splined as indicated at 88 to slide axially to and fro along the externally-splined end 86 of element 48 between the disengaged position of FIG. 1 and the partially engaged position of FIG. 2 where its external teeth 28 mesh in driving relation with the teeth 26 of driven element 16. The inturned finger tips 80 of sleeve 84, when seated in groove 78 of the axle, cooperate with the inner end of splined section 76 to retain the splined sleeve 48 against all but very limited axial movement.

A centrally-apertured step-cut washer 90 slips over the end of sleeve 84 where the annular step 92 formed between its inner and outer flanges 94 and 96, respectively, functions to retain a pin 98 in diametrical position within diametrically-opposed apertures 100 in sleeve 84. The outer end of coiled compression spring 102 abuts the inside surface of outer flange 96 of the step-cut washer 90 biasing the outer face of its inner flange 94 against pin 98 which, in turn, is biased against the outside of apertures 100. The inner end of spring 102 abuts the inturned annular flange 104 on the outer end of an axially-movable abutment that has been shown in the form of a spring-fingered cage 106, further details of which will be set forth presently.

In connection with the exploded view of FIG. 3, it should, perhaps, be pointed out that due to space limitations and the complexities of the assembly involved, it was not always practical or even understandable to attempt to show all the elements strung out in the exact way in which they are assembled. For instance, sliding gear 30 is actually housed inside cage member 106 with the spring fingers 108 of the latter seated in the slots 110 between its teeth 26 so as to permit relative axial but no relative rotational movement therebetween. When thus assembled, the inwardly-facing surfaces 112 of teeth 26 abut the outer end of coiled compression spring 114 while the outturned fingertips 116 on the inner ends of fingers 108 abut its inner end, all of which is clearly shown in FIGS. 1 and 2. In FIG. 3, on the other hand, while the outer end of spring 114 has been shown in its proper relation to teeth 28 of the sliding gear, i.e. so as to normally bias the latter into meshed engagement with teeth 26 of the driven element 16, the inner end of spring 114 is not in its proper relation in FIG. 3 to the outturned fingertips 116 nor is it possible to do so without showing the sliding gear and cage member in assembled relation. As a matter of fact, to assemble the sliding gear, cage 106 and spring 114 inside driven element 16, the cage is mounted on the sliding gear as previously noted and then the spring is passed over the fingertips 116 into abutting relation therebehind and against teeth 28. Removal of outer ball race 38 permits the resulting subassembly to be inserted where it is kept in place by the ball race.

When thus assembled, spring 114 biases the teeth 28 of the sliding gear 30 into meshed driving engagement with the teeth 26 of driven element 16 when outer cam ring 118 is extended as shown in FIG. 2. Spring 102, on the other hand, is continuously biasing the cage element 106 axially inward toward externally-flanged outer cam ring 118 of the roller cam subassembly 40. Comparing FIGS. 1 and 2, it will be noted that the marginal flange 120 bordering outer cam ring 118 lies in face-to-face relation with the outturned fingertips 116 of cage member 106 and it is this cam ring which moves axially to engage the clutch and release same to its disengaged position.

The cylindrical portion 122 of this outer cam ring contains three equiangularly-spaced generally V-shaped track-forming grooves 124 that are most clearly revealed in FIG. 3 where they will be seen to have their midpoints or apexes 126 spaced outward of their remote ends 128 which define stops for the balls 130 that ride therein.

The inner cam ring 72 which comprises part of the ball and cam subassembly 40 has a radial flange 132 abutting an inner circumferential flange 134, the outside of which contains a second equiangularly-spaced set of generally V-shaped track-forming grooves 136 in which balls 130 also ride. Each ball track 124 of the outer cam ring has its counterpart in one of the ball tracks 136 of the inner cam ring, the inner circumferential flange 134 of the latter lying in circumferentially-spaced face-to-face relation to the cylindrical portion 122 of the former, such relation being maintained by the balls 130 having diametrically-positioned portions thereof seated in overlapped portions of the paired ball tracks. Balls 130 and the paired ball tracks 124 and 136 cooperate with one another and spring 114 upon relative rotational movement between the inner and outer cam rings of the ball and cam subassembly 40 to shift the sliding gear axially between its engaged and disengaged positions in a manner which will be set forth in detail presently. Before doing so, however, it should be noted that the V-shaped ball tracks in the inner cam ring 72 open in the opposite direction to those (124) in the outer cam ring, i.e. their midpoints or apexes 138 are spaced inward axially of the stop-forming ends 140 thereof.

The outer circumferential flange 142 of the inner cam ring 72 lies inwardly of its radial flange 132, the latter defining an inwardly-facing annular shoulder between flanges 142 and 134. Outer circumferential flange 142 carries an annular ball track 144 on its outer surface which lies in opposed radially-spaced relation to a corresponding inwardly-facing ball track 146 in the outer ball race 38 previously described. Ball bearings 148 riding in these opposed ball tracks allow the inner cam ring 72 of the ball and cam subassembly to rotate relative to the outer cam ring 118 thereof for the purpose of extending and retracting the sliding gear.

Balls 130 are maintained in 120° equiangularly-spaced relation to one another by an apertured retaining ring 150, the particular one shown comprising a length of nylon strap formed into a ring and having generally pear-shaped ball-retaining apertures 152 therein (FIG. 3) that open onto one side of the ring. The ring thus formed fits loosely between the opposed grooved surfaces of the outer and inner cam rings 118 and 72, respectively. A similar ball-retaining member 154 with like ball-retaining apertures 156 is interposed between the ball track-carrying surfaces of elements 38 and 142 for the purpose of keeping ball bearings 148 separated while, at the same time, permitting them to turn freely.

Inner cam ring 72 is yieldably restrained against rotational movement by a friction subassembly that has been broadly designated by reference numeral 158 and which includes as a part thereof dog-carrying collar 50. The radially-extending flange 160 of this collar has a pair of friction rings 162 and 164 disposed on opposite faces thereof which cooperate with one another and with a wave washer or similar biasing element 166 to bias the assembly thus formed against annular inwardly-facing shoulder 132 of the inner cam ring. A snap ring 168 seated within annular groove 170 on the inside of the outer circumferential flange 142 of ring 72 forms a fixed abutment behind the assembly and abuts the inside face of the wave washer. Since the spindle S to which the dog-carrying collar 50 is non-rotatably anchored does not turn, the friction subassembly 158 functions to yieldably retard the inner cam ring and prevent it from rotating with outer cam ring 118 of the ball and cam subassembly 40 when the driven element 16 is being rotated relative to the axle A.

The only remaining elements of the assembly that have yet to be described are the snap ring 172 that fits into the peripheral groove 174 in the cylindrical section 46 of the splined sleeve 48 holding internally-flanged ring 176 thereon in position to cooperate with inwardly-facing annular shoulder 128 to retain brass bushing 44 in place therebetween.

With the clutch 10 in the disengaged mode shown in FIG. 1, the three balls 130 each lie at the midpoint or apexes of the paired ball tracks 124 and 136 that they bridge. The relationship of these tracks to one another and to balls 130 at this point is such that they be in side-by-side relation defining an "X" with the ball lying at their overlapped apexes. This, of course, is the closest that outer and inner cam rings 118 and 72 can approach one another axially and it represents the disengaged condition of the clutch since spring 102 has pushed the movable abutment 106 inward to a point beyond the teeth 26 of the driven element where the sliding gear cannot extend and mesh therewith without first contacting the inturned annular flange 104 bordering the outer end of said abutment. Spring 114 is at this point biasing the teeth 28 of the sliding gear against the ends of the slots between the fingers of cage element 106; however, its bias is insufficient to extend the latter overcoming the bias of spring 104 which acts in opposition thereto.

At this stage, axle A is disconnected from the drive train leading to the rear wheels and is, therefore, not turning. Driven element 16, on the other hand, is rotating with the front wheel since both are connected for rotation to the front wheel hub assembly H journalled for rotation upon the spindle S.

To engage the clutch, the operator first places the vehicle in the four-wheel drive mode by connecting axle A to the drive train. With the axle A thus operative, the operator starts the vehicle moving in either forward or reverse depending upon which direction he or she wishes to go. Both the wheel and axle will begin rotating in the same direction. As the axle turns, splined sleeve 48 and the sliding gear 30 along with cage 106 all turn with it since they are all interconnected for conjoint rotation by meshed splines or interlocked teeth and spring fingers. The bias of spring 114 is sufficient, however, to urge the outturned fingertips 116 of the cage element 106 against the opposed surface of radial flange 120 with sufficient force to cause the outer cam ring 118 to turn with the axle and the other of the elements linked thereto. Inner cam ring 72, on the other hand, is being held stationary by the friction subassembly 158 depending from the axle and pressing element 162 against the inwardly-facing shoulder 132 thereof. The contact between the bronze bushing 44 and the inner circumferential flange 134 of the inner cam ring is insufficient to overcome the braking effect of the friction subassembly 158 acting thereon. One thus has relative rotational movement between the inner cam ring 72 and the outer cam ring 118 of the ball and cam subassembly 40. As the outer cam ring 118 begins to turn, for example, away from the viewer as seen in FIG. 1, ball 130 will be rolled from the apex 126 to the near end of its track 124 while, at the same time, rolling to the far or remote end of track 136 in the inner cam ring. The resultant action is one of moving the outer cam ring 118 outward axially as it turns relative to the stationary inner cam ring thereby pushing the abutment-forming fingered cage 106 biased thereagainst to the right or axially outward further compressing spring 114 and retracting the inturned annular flange 104 blocking corresponding axial movement of the sliding gear 30. FIG. 2 shows the partially extended positions of the above-described elements; however, as yet, the sliding gear 30 may still remain in the disengaged position of FIG. 1 due to the fact that its teeth 28 are in no position to mesh with the teeth 26 of the drive element. Also, of course, the above-described cam action has created enough axial thrust upon the movable abutment 106 to overcome the bias upon compression spring 102. A few degrees relative movement between the axle and wheel, at most, is all that is required for teeth 26 and 28 to move into a position where they can interengage, whereupon, compression spring 114 will respond by pushing the sliding gear outward axially into the partially engaged position shown in FIG. 2.

With the sliding gear and driven element thus interengaged to define a driving connection between the axle A and the wheel-mounting flange F, the axle, sliding gear, cage 106, driven element 16, hub H, wheel-mounting flange F as well as the inner cam ring, outer cam ring and balls 130 of the cam and ball subassembly 40 will all start rotating as a unit because these balls will have reached the ends 128 and 140 of their respective paired ball tracks 124 and 138 thereby forcing the friction brake between shoulder 132 and friction member 162 to yield and allow the inner cam ring to turn. So long as the axle A remains engaged and the vehicle continues to move in the same direction, inner cam ring 72 will continue to slip relative to the elements of the friction subassembly 158.

In the event the vehicle is first actuated in four-wheel drive mode in the reverse direction such that, for instance, outer cam ring 118 would be turning toward rather than away from the viewer, the clutch will still engage in precisely the same way with the only difference being that the ball 130 would be rolled to the remote end of ball track 124 in the outer cam ring and be rolled to the near end of ball track 136 in the inner cam ring. Before looking at the action of the clutch when axle A is disconnected from the drive train, it might be well to see what happens when the direction of vehicle movement is reversed with both the axle and clutch engaged.

If one assumes that forward motion of the vehicle translates into the outer cam ring 118 turning away from the viewer in FIGS. 1 and 2 then, obviously, operating the vehicle in reverse will cause the outer cam ring, abutment 106, springs 102 and 114, sliding gear 30 and driven element 16 to turn toward the viewer; however, ball 130 will now be free to move away from the stops defined by the near end 128 of track 124 and the remote end 140 of track 136. Meanwhile, inner cam ring 72 is, once again, frictionally held against rotational movement by friction subassembly 158 urging friction element 162 against its shoulder 132, whereupon, the ball rolls to the opposite ends 128 and 140 of the paired ball tracks as the outer cam ring turns relative to the inner one. In so doing, the outer cam ring both turns and moves axially inward again as the ball passes through the apexes 126 and 138 of the ball tracks when the latter move into essentially side-by-side crossed relation before starting to diverge into end-to-end relation once again. All this time, spring 102 is trying to bias the abutment 106 inwardly; however, the driving friction between the meshed teeth 26 and 28 of the sliding gear and driven element is sufficient to keep these elements engaged thus overriding spring 102 and leaving the abutment 106 extended while the outer ring moves away therefrom and returns to the retracted position in which it is shown in FIG. 1. Accordingly, while outer cam ring 118 rotates over a half revolution relative to the stationary inner cam ring, no disengagement and reengagement of the sliding gear teeth and driven gear teeth takes place nor do either spring 102 or spring 114 have any effect upon the retraction and re-extension of the outer cam ring.

Lastly, the manner in which the clutch is disengaged will be examined. Actually, the situation is similar in many respects to the one just described where the direction of vehicle movement is reversed except, upon disengagement, axle A is disconnected from the drive train. In so doing, the outer cam ring 118 in FIG. 2 will rotate toward the viewer as before assuming the vehicle has been moving forward in four-wheel drive mode but no driving friction will be present between the interengaged teeth 28 and 26 of the sliding gear and driven elements effective to keep spring 102 compressed. As a result while the driven element and sliding gear will continue to turn as a unit so long as they remain interengaged, spring 102 will bias the movable abutment 106 inwardly into retracted position, whereupon, the inturned flange 104 on the outer end thereof will engage the corresponding end of the sliding gear and slide it inwardly along the splines 88 of splined sleeve 48 as it moves out of engagement. Meanwhile, outer cam ring 118 has been both rotated and cammed inwardly as before; however, when balls 130 reach the apexes 126 and 138 of their respective ball tracks 124 and 136, all further relative motion therebetween ceases since there is nothing urging them to turn, the frictional contact between the cylindrical section of the sliding gear, bushing 40 and the inner circumferential flange 134 of the inner cam ring being ineffective to do so. On the contrary, the friction subassembly 158 is active to keep the ball and cam subassembly 40 stationary while the driven element 16 turns relative thereto on roller bearing subassembly 38, 142, 144, 146 and 148. This condition, once achieved, subsists while the vehicle continues to move in reverse or, alternatively, is driven forward again. Thus, disengagement of axle A from the vehicle drive train and reversing the direction in which the vehicle has been moving in four-wheel drive mode for about a half a revolution of the wheel is all that is required to disengage the clutch 10. The resulting clutch is superior to the one forming the subject matter of my earlier application if for no other reason than it is far simpler and less expensive to manufacture since the toothed cams and toothed cam followers have been replaced by simple balls and ball-receiving tracks.

What is claimed is:

1. A selective drive clutch for automatically connecting a driven element to a drive element for conjoint coaxial rotation and for automatically disconnecting same when said drive element is not being driven, comprising: a first interlocking member mountable upon the driven member for rotational movement therewith; a second interlocking member mountable upon the drive element for rotational movement therewith and for axial movement relative thereto between retracted and extended positions; means carried by opposed end portions of said first and second interlocking members effective upon extension of the latter to interengage and effect a driving connection therebetween; first biasing means operatively associated with said second interlocking member normally biasing same into retracted position; and actuating means responsive to limited relative rotational movement between said drive and driven elements for effecting an axial shift of said second interlocking member between its extended and retracted positions, said means including inner and outer grooved cam rings, at least two equiangularly-spaced cam followers in the form of balls seated in the grooves and interconnecting the cam rings for limited relative axial and rotational movement in coaxial circumferentially-spaced relation, and braking means having a fixed friction surface engaging said inner cam ring effective to yieldably retard rotation thereof, the outer of said cam rings being movable both axially and rotarially with said second interlocking member on the end thereof remote from said first interlocking member, the grooves in said cam rings comprising an opposed pair of generally V-shaped tracks for each ball facing opposite one another in axially-divergent overlapped relation, said paired ball tracks when interconnected by a ball in side-by-side relation being responsive to rotational movement of the drive element in either direction while the inner cam ring is yieldably restrained against rotation to move said tracks into an overlapped end-to-end relation operative to move the outer cam ring axially from a retracted into an extended position thereby extending the second interlocking member associated therewith into interengaged driving relation with the first interlocking member, and said balls when seated within the overlapped ends of said paired tracks cooperating therewith to overcome the braking action of the braking means yieldably retarding rotation of said inner cam ring while defining a driving connection between the latter and said outer cam ring causing them to rotate as a unit upon continued rotation of said drive element in the same direction, said ball tracks and ball also cooperating in response to reversal of said drive element while the first and second interlocking elements remain interlocked and with said tracks disposed in end-to-end relation to momentarily retract and extend said outer cam ring as well as rotate same relative to said inner cam ring while the latter is restrained against rotational movement thereby placing the opposite ends of the tracks carried thereby into an overlapped end-to-end relation effective to maintain the driving connection between the first and second interlocking members throughout reversal of the drive element, and said ball and overlapped opposite track ends again cooperating upon continued rotation of said drive element in reverse to overcome the braking action of the braking means yieldably retarding rotation of said inner cam ring while defining a driving connection between the latter and said outer cam ring effective to rotate them as a unit, and said ball tracks and ball further cooperating with one another and with the first biasing means in response to deactivation of said drive means into a free-wheeling condition and rotation of said driven element relative thereto in a direction opposite to that in which said driven element was last driven while said inner cam ring remains restrained against rotation and said tracks are disposed in end-to-end relation to rotate said interlocked first and second interlocking members along with said outer cam ring as a unit to return the paired ball tracks into side-by-side relation thereby retracting said outer cam ring and associated second interlocking member so as to disengage under the influence of the bias exerted thereon by said first biasing means.

2. The selective drive clutch as set forth in claim 1 wherein each track of the opposed pairs thereof have stop-defining portions located at opposite ends thereof and an apex therebetween, wherein the ball is seated within the apexes of the pair when the inner and outer cam rings are so oriented relative to one another as to place said grooves in side-by-side relation, and wherein the ball is seated within adjacent end portions of the paired grooves when in end-to-end relation cooperating therewith to prevent a gap from opening therebetween upon continued rotation of one cam ring relative to another in the same direction that brought them into end-to-end relation.

3. The selective drive clutch as set forth in claim 1 wherein the outer cam ring is mounted for independent rotational as well as axial movement relative to the second interlocking member, a second biasing means is interposed between the outer cam ring and second interlocking member normally biasing them apart, and means defining an axially-movable abutment normally blocking movement of the second interlocking member into extended position interconnects the outer cam ring and first biasing means effective to maintain a minimum axial spacing therebetween, said abutment cooperating with said outer cam ring upon extension thereof to move from a retracted into an extended position overcoming the bias exerted thereon by said first biasing means thereby permitting movement of said second interlocking member into extended interengaged position under the bias of said second biasing means upon alignment of the interengageable end portion thereof with the corresponding interengageable end portion of the first interlocking means occasioned by relative rotational movement of said drive element relative to said driven element.

4. The selective drive clutch as set forth in claim 1 wherein the outer cam ring is mounted for independent rotational as well as axial movement relative to the second interlocking member, a second biasing means is interposed between the outer cam ring and second interlocking member normally biasing them apart, and means defining an axially-movable abutment normally blocking movement of the second interlocking member into extended position interconnects the outer cam ring and first biasing means effective to maintain a minimum axial spacing therebetween, said first and second biasing means being so interrelated to one another that the latter is ineffective to bias the second interlocking element into interengaged position with the first when the former is operative to bias the movable abutment and outer cam ring into retracted position.

5. The selective drive clutch as set forth in claim 1 wherein the outer cam ring is mounted for independent rotational as well as axial movement relative to the second interlocking member, a second biasing means is interposed between the outer cam ring and second interlocking member normally biasing them apart, and means defining an axially-movable abutment normally blocking movement of the second interlocking member into extended position interconnects the outer cam ring and first biasing means effective to maintain a minimum axial spacing therebetween, said movable abutment cooperating with the first biasing means to simultaneously bias both the outer cam ring and second interlocking member into retracted position upon disengagement of said drive means and rotation of said driven means relative to the latter.

6. The selective drive clutch as set forth in claim 1 wherein the outer cam ring is mounted for independent rotational as well as axial movement relative to the second interlocking member, a second biasing means is interposed between the outer cam ring and second interlocking member normally biasing them apart, and means defining an axially-movable abutment normally blocking movement of the second interlocking member into extended position interconnects the outer cam ring and first biasing means effective to maintain a minimum axial spacing therebetween, and wherein said first and second interlocking members cooperate when drivingly interengaged upon reversal of the drive means to maintain the movable abutment in extended position overcoming the retracting bias of the first biasing means thereon while said outer cam ring retracts and re-extends.

7. The selective drive clutch as settforth in claim 6 wherein with said interlocking members drivingly interengaged and the movable abutment extended against the bias exerted thereon by the first biasing means, the movable abutment in extended position is operative to operatively disconnect the second biasing means from said outer cam ring and permit independent movement thereof into retracted and re-extended position as the drive means reverses.

8. The selective drive clutch as set forth in claim 3 wherein said first and second biasing means cooperate with one another upon extension of said outer cam ring when the opposed interengageable end portions of said interlocking members are axially misaligned to effect extension of said movable abutment while leaving said second interlocking means retracted in opposition to the extending bias exerted thereon by said second biasing means.

9. The selective drive clutch as set forth in claim 3 wherein said first and second biasing means being so interrelated to one another that the latter is ineffective to bias the second interlocking element into interengaged position with the first when the former is operative to bias the movable abutment and outer cam ring into retracted position.

10. The selective drive clutch as set forth in claim 3 wherein said movable abutment cooperating with the first biasing means to simultaneously bias both the outer cam ring and second interlocking member into retracted position upon disengagement of said drive means and rotation of said driven means relative to the latter.

* * * * *